Dec. 31, 1963   M. E. KLINE   3,115,723
FISH HOOK HOLDER
Filed April 30, 1962
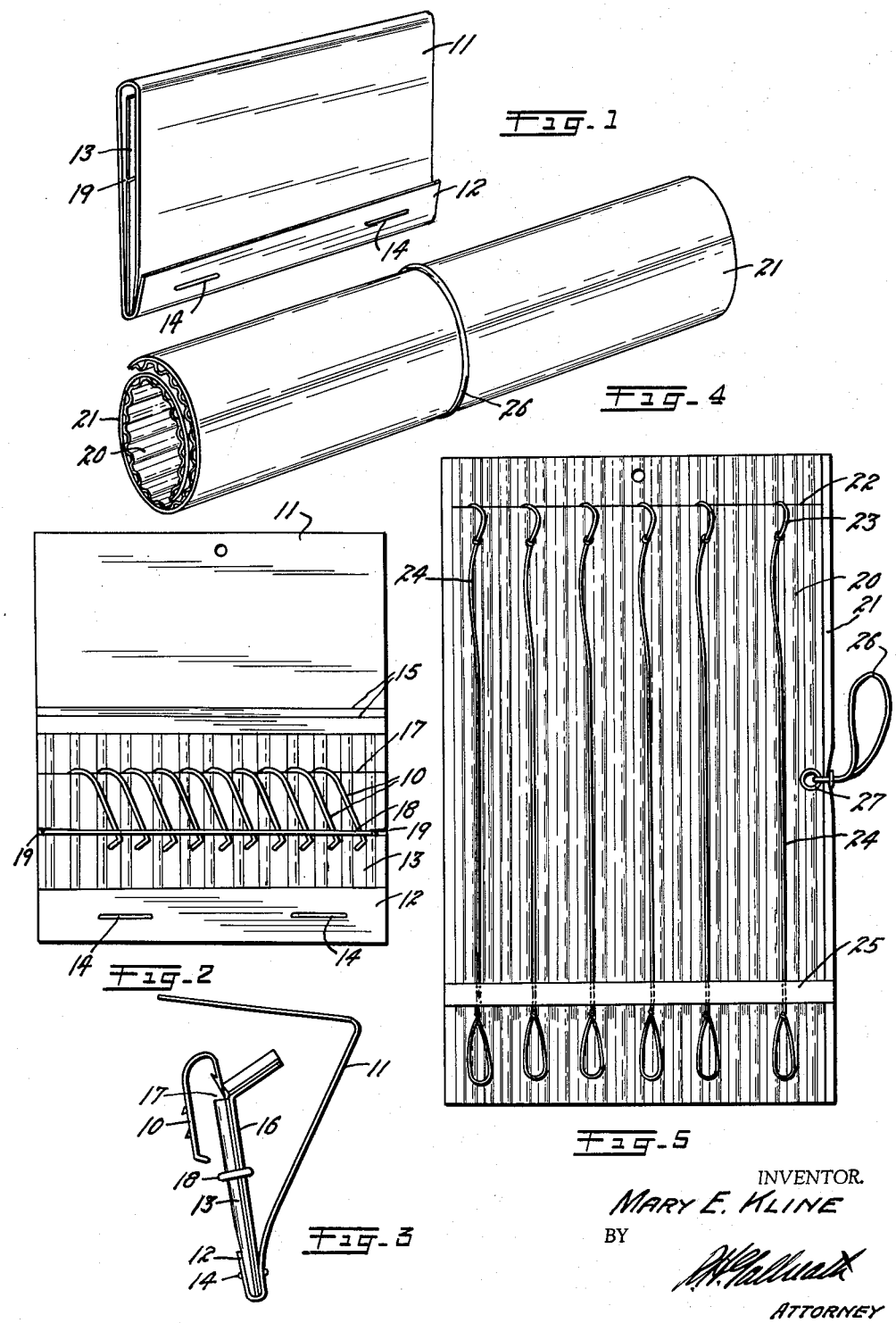
INVENTOR.
MARY E. KLINE
BY
ATTORNEY

United States Patent Office 3,115,723
Patented Dec. 31, 1963

3,115,723
FISH HOOK HOLDER
Mary E. Kline, Denver, Colo., assignor to Mile Hi Tackle Co., Denver, Colo., a corporation of Colorado
Filed Apr. 30, 1962, Ser. No. 191,022
5 Claims. (Cl. 43—57.5)

This invention relates to means for packaging fish hooks and has for its principal object the provision of a carrier for bulk fish hooks and snelled fish hooks which will enable the fisherman to conveniently carry a supply of hooks in the pocket in a neat, secure, and readily-accessible condition so that they can be quickly and easily removed and replaced in the carrier under adverse fishing conditions without loss or entanglement of the hooks.

A further object is to provide a fish hook carrier which will securely maintain the hooks in separated position and from which the hooks cannot be accidentally removed until needed for use.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

FIG. 1 is a perspective view of one form of the invention, designed for holding a plurality of bulk fish hooks, illustrating it in the closed pocket position;

FIG. 2 is a front elevational view illustrating the first form in the open, locked, hook-exposing condition;

FIG. 3 is a side edge view of the first form showing it in the unlocked position to release or receive a fish hook;

FIG. 4 is a perspective view of an alternate form of the invention, designed for similarly holding a plurality of snelled fish hooks, illustrating it in the closed pocket position; and FIG. 5 is a front elevational view of the alternate form of FIG. 4 illustrating it in the open, locked hook-exposing position.

The form of FIGS. 1, 2 and 3 is relatively small approximating the size of a conventional, paper-match folder and is designed for holding a plurality of individual fish hooks 10 in secured, separated condition.

It comprises a rectangular card-board cover sheet 11, the lower edge of which is folded upwardly, as shown at 12, over the lower edge of a corrugated, rectangular insert 13, to be later described, to which it is stapled by means of suitable staples 14. The cover sheet 11 is horizontally scored, as indicated at 15, immediately above the insert 13 so that its upper portion forms a flap which can be folded downwardly over the insert 13 and tucked in place between the upturned fold 12 and the insert 13, as shown in FIG. 1, similarly to the manner in which a conventional paper match folder is closed.

The insert 13 comprises a front corrugated sheet cemented along the back of each corrugation to a backing sheet 16 as is customary in the manufacture of one ply corrugated board. The insert is positioned in the cover sheet so that the corrugations extend vertically to provide a plurality of uniformly spaced vertical tubes.

One of the principal features of this invention relates to the means employed for securing the fish hooks 10 to the insert in uniform, secure, spaced relation. This is accomplished by making a horizontal knife cut 17 across the corrugated portion of the insert 13 adjacent the top of the vertical tubes formed by the corrugations. The knife cut 17 does not extend through the backing sheet 16, so that the latter forms a hinge along the back of the knife cut.

A resilient band 18 of rubber or other suitable material horizontally surrounds the corrugated insert in parallel spaced relation to the knife cut 17. The band 18 is held in proper position by being placed in retaining notches 19 in the ends of the corrugated insert.

The hooks 10 are placed in the holder by tilting the upper edge of the insert rearwardly to open the knife cut 17, thence hooking the points of the hooks in the open tops of the corrugation tubes, which have been exposed by the rearwardly tilted upper portion of the insert, as shown in FIG. 3. The eye extremities of the hooks are then laid in the concavities in the front of the corrugated insert, as shown in FIG. 2, where they are held in place by the tension of the resilient band 18.

The cover sheet is then folded back to the closed position of FIG. 3 and in folding will straighten the insert to close the knife cut 17 and lock the hooks in place. A hook can be removed only by reversing the above procedure so that there is no danger of accidental dislodgement.

The alternate form of the invention, shown in FIGS. 4 and 5, uses the same means for locking the hooks in place. It comprises a flexible, corrugated front sheet 20, the concavities of which are cemented to a flexible back sheet 21. The corrugated front sheet has a horizontally extending knife cut 22 parallel to and adjacent the top of the corrugated sheet. The knife cut does not extend through the back sheet 21 so that the latter acts as a hinge when the upper portion of the combined sheets are turned backwardly for the insertion and removal of hooks as described with reference to the first form.

The alternate form has a greater vertical length than the first form to accommodate hooks, as indicated at 23 to which snells 24 are permanently attached. The hooks 23 are locked in the knife cut 22 as previously described with reference to the knife cut 17 and the snells 24 lie in the concavities between the corrugation tubes where they are held in place in a retaining band 25. The retaining band 25 is preferably a narrow strip of self-adhering material such as "Scotch tape" cemented to the convexities and extending over the concavities of the corrugated front sheet 20.

After the hooks are in place, the entire assembly can be rolled into a convenient carrying tube, as shown in FIG. 4. A rubber band 26 is attached through a grommet 27 in the sheets. The band 26 can be slipped around the rolled sheets to retain them in their convenient, tubular, rolled form. To remove a snelled hook it is only necessary to swing the top of the sheets rearwardly to open the knife cut 22 then lift the hook from place drawing the snell from beneath the band 26.

While specific forms of the invention have been illustrated and described herein, it is to be understood that the same may be varied within the scope of the appended claims, without departing from the spirit of the invention.

Having thus described the invention what is claimed and desired to be secured by Letters Patent is:

1. A holder for fish hooks comprising: a sheet of corrugated material and a flat, flexible backing sheet cemented to the convex portions of the back of said corrugated sheet, the corrugated sheet being provided with a cut extending at right angles to the direction of the corrugations so that the upper portion thereof may be bent rearwardly, with the backing sheet forming a hinge, so as to open said cut to allow the points of fish hooks to be inserted in said corrugations and locked in place therein by returning the upper portion of said corrugated sheet back into the plane of the lower portion of said corrugated sheet; and a band extending across the front of said corrugated sheet below said cut for retaining said hooks in the concavities of said sheet.

2. A holder for fish hooks as described in claim 1 having releasable means for holding the upper portion of said sheet in the plane of the lower portion thereof to maintain said cut closed.

3. A holder for fish hooks as described in claim 2 in which the releasable means comprises a cover sheet attached to the lower extremity of said corrugated sheet and adapted to fold over the top thereof.

4. A holder for fish hooks comprising: a sheet of corrugated material and a flat, flexible backing sheet cemented to the convex portions of the back of said corrugated sheet, there being a cut formed at right angles across the corrugations of said corrugated sheet so that the upper portion thereof may be bent rearwardly, with the backing sheet forming a hinge, so as to open said cut to allow the points of fish hooks to be inserted in said corrugations and locked in place therein by returning the upper portion of said corrugated sheet back into the plane of the lower portion of said corrugated sheet; a cover sheet secured to the bottom of said corrugated sheet and extending upwardly over the back and thence downwardly over the front thereof; means for detachably securing the lower edge of the downwardly turned portion of said cover sheet to said corrugated sheet; and an endless resilient band horizontally surrounding said corrugated sheet below the cut therein for retaining the lower portions of said hooks in the concavities in the front of said sheet.

5. A holder for fish hooks as described in claim 4 having notches formed in the side edges of said sheet, said band being positioned in said notches to prevent vertical movement of said band.

References Cited in the file of this patent

UNITED STATES PATENTS 2,499,313     Hoag _____ Feb. 28, 1950

FOREIGN PATENTS 12,646     Great Britain _____ of 1894